United States Patent [19]
Wilkins

[11] 3,912,473
[45] Oct. 14, 1975

[54] QUICK-CLEAN VENT FILTER

[76] Inventor: Wayne Eldo Wilkins, 3063 Hiway 50, Grand Junction, Colo. 81501

[22] Filed: May 21, 1973

[21] Appl. No.: 362,093

[52] U.S. Cl. .................. 55/501; 55/511; 55/529; 55/DIG. 6; 55/DIG. 31; 55/DIG. 36; 98/115 K
[51] Int. Cl.² ........................................ B01D 46/10
[58] Field of Search ............ 55/383, 467, 480, 490, 55/495, 501, 503–506, 511, DIG. 6, DIG. 31, DIG. 36, 478, 494, 497, 498, 509, 527, 493, 529, DIG. 20; 98/115 K, 114, 43, 39; 126/299 A, 299 B

[56] References Cited
UNITED STATES PATENTS

| 1,937,483 | 11/1933 | Shurtleff | 98/39 X |
| 2,548,942 | 4/1951 | Brown | 55/501 X |
| 2,595,833 | 5/1952 | Flaherty | 55/DIG. 6 |
| 2,717,036 | 9/1955 | Harris | 55/DIG. 6 |
| 3,220,079 | 11/1965 | Aggson | 98/118 X |
| 3,278,114 | 10/1966 | Gibbs | 55/DIG. 36 |
| 3,616,622 | 11/1971 | Friedman | 55/490 |

OTHER PUBLICATIONS

Hanover House Gift Guide, Poplar St., Hanover, Pa. 17331, pp. 15, 40, 41.

Primary Examiner—Frank W. Lutter
Assistant Examiner—David L. Lacey
Attorney, Agent, or Firm—K. S. Cornaby

[57] ABSTRACT

A filter unit including a circular housing containing replaceable filter pads, and further having permanent magnets attached to the housing for attaching the filter unit over a fan grill opening.

3 Claims, 2 Drawing Figures

QUICK-CLEAN VENT FILTER

BACKGROUND OF THE INVENTION

The concept of the present invention was formulated in response to the necessity of a method which prevents the build-up of soot ashes, dirt, grease or other deposits on the vent discharge components, which are often in awkward places to clean, and at best, present a messy and time-consuming task.

OBJECTS OF THE PRESENT INVENTION

The major of the present invention is the prevention of the build-up of the afore-mentioned dirt and grease particles which are attracted to the fan and motor housing during normal operation of the unit.

A secondary object is the ease and convenience of changing or replacing the filter pads as they become filled with impurities.

DETAILED DESCRIPTION

Figure 2:
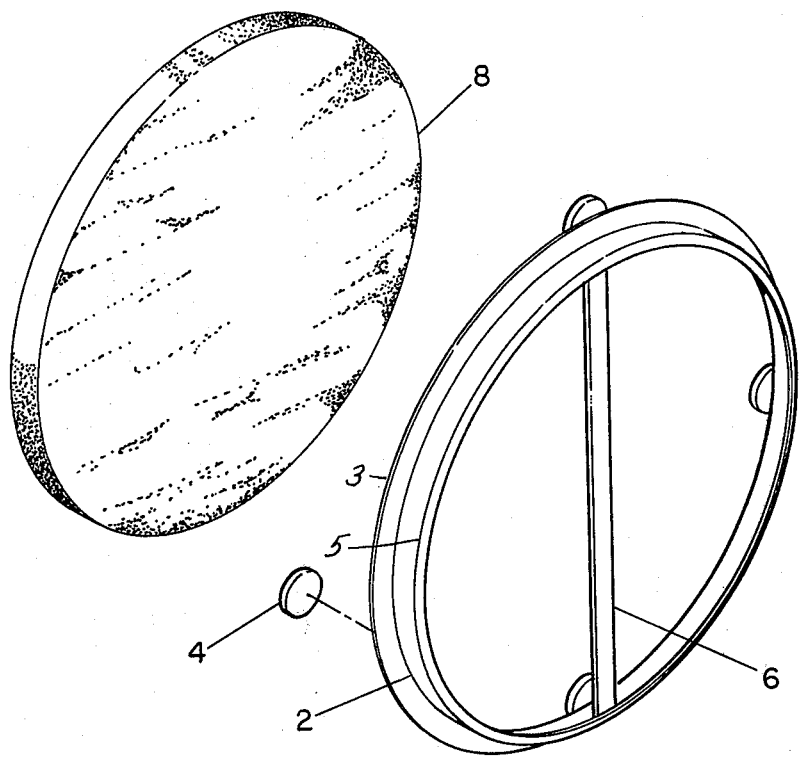
FIG. 2 is a three-dimensional disassembled view of the device, showing the related components.

The complete device, as fabricated in accord with the salient disclosure, is described as follows:

As shown in FIG. 2, the device consists of the filter housing ring (reference numeral 2), having an outwardly extending annular flange (reference numeral 3) at one end and an inwardly extending annular flange (reference numeral 5) at its other end. Four permanent magnets (reference numeral 4) are attached to the outwardly extending flange and a vertically mounted retaining strap (reference numeral 6), which keeps the filter pad (reference 8) in place inside the housing.

Figure 1:
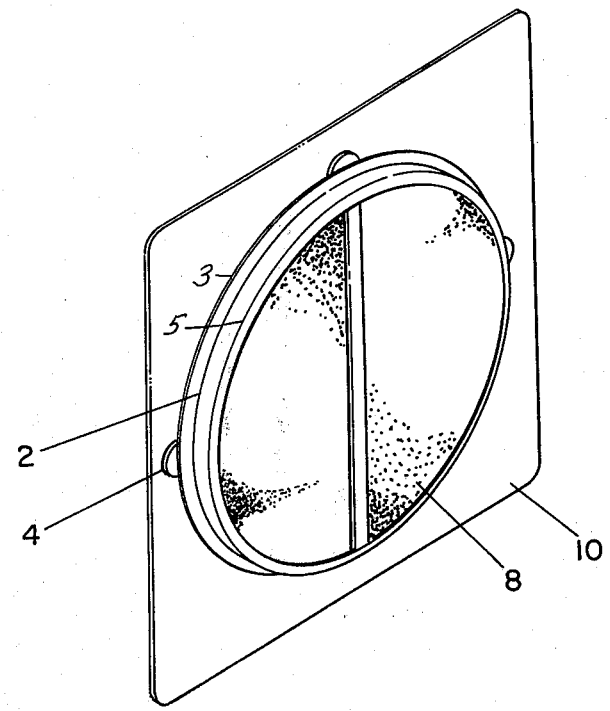
FIG. 1 is a three-dimensional illustration of the device as shown mounted in place of the fan grill.

As shown in FIG. 1, the device is attached to the fan grill (reference numeral 10) in the position of normal operation on the vent unit.

The filter housing may be fabricated from a durable, light-weight metal such as aluminum or brass, and the filter pads may be formed from a sheet of spun-glass or other adequate filter material of the correct thickness and diameter.

What is claimed for the present invention is:

1. A filter apparatus intended for use with vent and exhaust type fan assemblies mounted in a wall or ceiling of a room with a perforated type fan grill disposed over the intake end of the fan assembly, the filter apparatus comprising:

a hollow open ended cylindrical housing having cylindrical side walls terminating at opposite ends in an inner end and an outer end, a retaining strap extending diametrically between the side walls at the outer end thereof, means for retaining the strap between said side walls, an annular flange affixed to said inner end and projecting radially outwardly therefrom to define a circular outer edge having a diameter greater than the interior diameter of the side walls;

a flat circular disc shaped fibrous porous filter pad having flat parallel front and back surfaces interconnected about their peripheral edges by cylindrical side wall surfaces, the diameter of said pad being substantially equal to the interior diameter of said housing side walls, the thickness of said pad adapted to be received between said retaining strap at said front face and a surface of said fan grill at said back face; and a plurality of permanent magnet members affixed to circumferally spaced apart positions on said annular flange and projecting outwardly therefrom in a direction opposed to said housing side walls, said magents adapted to magnetically retain said housing to a surface of said fan grill with said filter pad overlying said fan grill perforations between said retaining strap and said fan grill to filter all air passing therethrough and into said fan assembly to prevent the build-up of dirt, grease, and the like in said fan assembly, the housing and filter pad being readily removed from said fan grill for cleansing and replacement of said filter pad and permitting ready access to said fan assembly for servicing thereof.

2. The filter apparatus as set forth in claim 1 wherein said permanent magnet members are further characterized as each being of a flat circular disc member having a front face and a back face, said back face affixed to said annular flange with said front face adapted to magnetically attract and retain said housing to said fan grill.

3. The filter apparatus as set forth in claim 2 wherein said means for retaining the strap between said side walls comprises an annular flange formed integrally with said housing outer end and projecting radially inwardly therefrom to define an interior shoulder therewith, and wherein said filter pad is adapted to engage said shoulder when resting in said housing with said peripheral edges of said filter pad front surface in engagement with said shoulder defined by said inwardly directed annular flange.

* * * * *